United States Patent
Nave et al.

(10) Patent No.: US 11,574,656 B2
(45) Date of Patent: Feb. 7, 2023

(54) AUTOMATED TAPE LIBRARY DEEP SLOT PROTECTION

(71) Applicant: International Business Machines Corporation, Armonk, NY (US)

(72) Inventors: Shawn M. Nave, Tucson, AZ (US); Andrew Stuart Green, Tucson, AZ (US); Justin Melby, Circle Pines, MN (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 16/789,541

(22) Filed: Feb. 13, 2020

(65) Prior Publication Data

US 2021/0257005 A1 Aug. 19, 2021

(51) Int. Cl.
| | | |
|---|---|---|
| *G11B 33/04* | (2006.01) | |
| *G11B 33/08* | (2006.01) | |
| *G06F 3/06* | (2006.01) | |
| *G11B 33/06* | (2006.01) | |

(52) U.S. Cl.
CPC ............ *G11B 33/04* (2013.01); *G06F 3/0604* (2013.01); *G06F 3/0634* (2013.01); *G06F 3/0682* (2013.01); *G11B 33/08* (2013.01); *G11B 33/06* (2013.01)

(58) Field of Classification Search
CPC ...... H05K 5/0221; H05K 7/1489; H05K 7/14; H05K 5/0013; H05K 7/1408; G11B 33/04; G11B 33/08; G06F 3/0604; G06F 3/0634; G06F 3/0682; G06F 3/0632
See application file for complete search history.

(56) References Cited

U.S. PATENT DOCUMENTS

| | | | | |
|---|---|---|---|---|
| 4,964,810 A | * | 10/1990 | Malotke | H01R 12/7005 361/801 |
| 5,206,845 A | * | 4/1993 | Baxter | G11B 17/225 |
| 5,235,474 A | | 8/1993 | Searle | |
| 5,247,406 A | * | 9/1993 | Apple | G11B 15/6825 |
| 5,378,093 A | * | 1/1995 | Schroeder | B61D 45/006 410/43 |
| 5,426,581 A | * | 6/1995 | Kishi | G11B 15/6835 |
| 5,442,500 A | * | 8/1995 | Hidano | G11B 23/0236 |
| 5,537,268 A | * | 7/1996 | Felde | G11B 17/225 |
| 5,652,742 A | * | 7/1997 | Baca | G11B 23/0236 369/30.31 |
| 5,708,563 A | * | 1/1998 | Cranston, III | G06F 1/186 361/801 |
| 5,746,385 A | * | 5/1998 | Leger | G11B 15/6835 242/337 |
| 5,820,055 A | | 10/1998 | Leger et al. | |
| 5,936,795 A | * | 8/1999 | Theobald | G11B 15/681 360/92.1 |
| 5,950,837 A | * | 9/1999 | Barber | H05K 7/1408 206/451 |
| 6,226,252 B1 | * | 5/2001 | Coffin | G11B 15/6835 369/30.43 |
| 6,340,087 B1 | * | 1/2002 | Bridges | B65D 81/05 206/592 |

(Continued)

*Primary Examiner* — Brian E Miller (74) *Attorney, Agent, or Firm* — Jared L. Montanaro (57) ABSTRACT

One or more tape cartridge restraint brackets may be generated. At least one tape cartridge restraint bracket may be positioned in one or more deep slots in a rear portion of a tape library.

12 Claims, 13 Drawing Sheets

(56) References Cited

U.S. PATENT DOCUMENTS

| | | | | |
|---|---|---|---|---|
| 6,406,109 B1* | 6/2002 | Arnal | | G11B 17/22 |
| | | | | 312/333 |
| 6,445,651 B1* | 9/2002 | Felde | | G11B 15/6835 |
| | | | | 360/92.1 |
| 6,580,582 B1* | 6/2003 | Caverly | | G11B 15/68 |
| | | | | 360/92.1 |
| 6,661,747 B2 | 12/2003 | Mueller et al. | | |
| 7,075,796 B1* | 7/2006 | Pritchett | | H05K 7/1408 |
| | | | | 361/756 |
| 7,221,536 B2 | 5/2007 | Cox et al. | | |
| 7,408,783 B2* | 8/2008 | Nave | | G11B 33/128 |
| 7,729,112 B2* | 6/2010 | Atkins | | G11B 33/08 |
| | | | | 361/679.37 |
| 9,532,478 B1* | 12/2016 | Good | | H05K 7/1401 |
| 10,624,226 B1* | 4/2020 | Alvarado | | H05K 7/1408 |
| 11,127,430 B1* | 9/2021 | Nave | | G06F 3/0686 |
| 2001/0000311 A1* | 4/2001 | Coffin | | G11B 15/6835 |
| 2002/0053454 A1* | 5/2002 | Li | | H05K 7/1408 |
| | | | | 174/535 |
| 2003/0039182 A1* | 2/2003 | Mueller | | G11B 17/225 |
| 2003/0173315 A1* | 9/2003 | Dac Ta | | G06F 1/186 |
| | | | | 211/41.17 |
| 2003/0233855 A1* | 12/2003 | Pirveysian | | H05K 7/1408 |
| | | | | 70/62 |
| 2004/0090750 A1* | 5/2004 | Lauchner | | H05K 7/1421 |
| | | | | 361/725 |
| 2004/0170007 A1* | 9/2004 | Chen | | H05K 7/1408 |
| | | | | 361/801 |
| 2004/0261087 A1* | 12/2004 | Nave | | G11B 33/128 |
| 2004/0264121 A1* | 12/2004 | Orriss | | G06F 1/187 |
| 2005/0006270 A1* | 1/2005 | Byrne | | G11B 33/08 |
| | | | | 206/521 |
| 2005/0080512 A1* | 4/2005 | Critchlow | | B25J 9/1692 |
| 2005/0254164 A1* | 11/2005 | Cox | | G11B 15/688 |
| | | | | 360/92.1 |
| 2007/0068840 A1* | 3/2007 | Stefanik | | B65D 81/05 |
| | | | | 206/521 |
| 2007/0110297 A1* | 5/2007 | Pierce | | G06T 7/80 |
| | | | | 700/214 |
| 2008/0073469 A1* | 3/2008 | Mushan | | H05K 7/1489 |
| | | | | 248/205.1 |
| 2008/0217497 A1* | 9/2008 | Yang | | H05K 7/1489 |
| | | | | 248/298.1 |
| 2008/0218960 A1 | 9/2008 | Nave et al. | | |
| 2009/0040653 A1* | 2/2009 | Green | | G11B 17/225 |
| | | | | 242/327 |
| 2010/0058374 A1* | 3/2010 | Jesionowski | | G11B 15/6885 |
| 2011/0094978 A1* | 4/2011 | Bailey | | H05K 7/1495 |
| | | | | 211/26.2 |
| 2012/0127649 A1* | 5/2012 | Chen | | H05K 7/1487 |
| | | | | 248/220.21 |
| 2012/0237321 A1* | 9/2012 | Akiyama | | G11B 17/225 |
| | | | | 414/222.02 |
| 2013/0001114 A1* | 1/2013 | Anderson | | G11B 17/225 |
| | | | | 206/307 |
| 2013/0032506 A1* | 2/2013 | Grenchus, Jr. | | B65D 81/056 |
| | | | | 53/396 |
| 2013/0265695 A1* | 10/2013 | Canfield | | H05K 7/1489 |
| | | | | 361/679.01 |
| 2013/0320827 A1* | 12/2013 | Manes | | G11B 15/6835 |
| | | | | 403/326 |
| 2014/0271065 A1* | 9/2014 | Manes | | B66D 5/32 |
| | | | | 414/281 |
| 2014/0353458 A1* | 12/2014 | Wu | | G11B 33/128 |
| | | | | 248/581 |
| 2016/0185578 A1* | 6/2016 | Manes | | B66D 5/32 |
| | | | | 74/530 |
| 2017/0236555 A1* | 8/2017 | Trachy | | G11B 15/6835 |
| | | | | 414/807 |
| 2018/0268863 A1* | 9/2018 | Gale | | G11B 15/68 |
| 2019/0141852 A1* | 5/2019 | Anderson | | H05K 7/1489 |
| 2019/0304221 A1* | 10/2019 | Gale | | G11B 23/287 |
| 2019/0343012 A1* | 11/2019 | Ho | | H05K 5/0221 |
| 2021/0240235 A1* | 8/2021 | Christensen | | H05K 5/0221 |

* cited by examiner

AUTOMATED TAPE LIBRARY DEEP SLOT PROTECTION

BACKGROUND

The present disclosure relates generally to the field of tape drive systems, and more specifically to protecting tape cartridges installed in slots within an automated tape library during shipping.

Tape libraries are typically shipped without tape cartridges installed. Large tape libraries can hold capacities in the hundreds, or thousands, of tape cartridges. With the tape cartridges shipped separate from the library, it takes significant time and personnel to unpack tape cartridges from their shipping containers and load into the tape library.

SUMMARY

Embodiments of the present disclosure include a method and system for shipping one or more tape cartridges installed in slots within an automated tape library. One or more tape cartridge restraint brackets may be generated. At least one tape cartridge restraint bracket may be positioned in one or more deep slots in a rear portion of the tape library.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape drive systems, and more specifically to protecting tape cartridges installed in slots within an automated tape library during shipping. It should be noted that a "tape drive" is a system that utilizes tape to store information, further noted is that a "tape cartridge" is defined a structure that house "tape" which is defined as a flexible magnetic tape medium. While the present disclosure is not necessarily limited to such applications, various aspects of the disclosure may be appreciated through a discussion of various examples using this context.

Cloud and/or hyperscale datacenters are currently deploying mass amounts of server and storage products into production to meet growing demands of cloud compute and storage. Based on the large physical and resource scale of these types of datacenters, all costs (e.g., physical, resource-based, etc.) are being scrutinized to see which costs are to be reduced, which will in turn create a significant resource cost saving. As such, many of the large datacenters are turning to automated tape libraries to fulfill their storage needs at a low resource cost.

While tape in itself is a low resource cost method for storing data; large cloud and hyperscale customers are looking to drive resource cost down further. Accordingly, installation costs are being examined. The nature of the design of tape libraries is such that tape cartridges must be easily removable by the library robotics in order to load tapes into tape drives where data can be read/written. Large tape libraries can hold capacities in the hundreds, or thousands, of tape cartridges, and typically, tape libraries are shipped without tape cartridges installed. Further, there are no known solutions other than shipping tape cartridges separate from the tape library and installing them after the tape library has already been installed at a user facility. With the tape cartridges shipped separate from the tape libraries, it takes significant time and personnel (e.g., costs, resources, resource costs, etc.) to unpack tape cartridges from their shipping containers and load into the tape library. If tens, or hundreds, of tape libraries are being deployed in these now commonplace massive datacenters, the resource costs associated with installation become significantly large.

Based on this, a user may desire to ship tape cartridges pre-installed in a tape library, or tape libraries (e.g., directly from a manufacturing plant to a datacenter, etc.). Preinstallation of the tape cartridges in the tape library would significantly decrease the installation time of installing the tape cartridges and thus save overall resource costs (e.g., personnel, packing materials, etc.).

Proposed in this disclosure is a method and a system to provide a way to ship tape cartridges safely installed within a tape library in which tape cartridges are designed to be easily removed from cartridge slots. Specifically disclosed is an embodiment that details how to ship tape cartridges safely within a deep slot library where cartridges are stacked behind each other for maximum storage capacity and density.

Accordingly, in some embodiments, a processor (or a system, etc.) may generate one or more tape cartridge restraint brackets. The processor may position at least one tape cartridge restraint bracket in one or more storage slots on a front door portion of a tape library. The processor may position at least one (other) tape cartridge restraint bracket in one or more deep slots in a rear portion of the tape library.

In some embodiments, each tape cartridge restraint bracket may be generated using one or more sheet metal plates (e.g., aluminum, steel, any suitable metal for use in a tape library, etc.) that are respectively attached with one or more foam (e.g., polyurethane, etc.) cushions. In some embodiments, the one or more foam cushions may be placed on the one or more sheet metal plates such that the one or more foam cushions contact a front portion of the one or more tape cartridges after the one or more tape cartridges are installed into respective storage slots of the tape library. In some embodiments, the one or more foam cushions may be cut into strips and placed on the one or more sheet metal plates. In some embodiments, the one or more foam cushions may be placed on the one or more sheet metal plates by adhering the one or more foam cushions to the one or more sheet metal plates via an adhesive that does not interfere with the mechanics of the tape library and/or the tape cartridges (e.g., the adhesive does not shift once applied to both the foam cushions and sheet metal plates such that the adhesive cannot attach to or stick to any portions, internal or external, of the tape library or the tape cartridges).

In some embodiments, each of the front portions of the one or more tape cartridges may contact a at least one of the one or more foam cushions such that the one or more tape cartridges are held on each side to prevent a twisting motion and/or a swivel motion within the one or more storage slots during transport.

In some embodiments, the at least one of the one or more foam cushions may be strategically (e.g., deliberately, purposely, etc.) positioned on the one or more sheet metal plates so as to not interfere with respective latch mechanisms of the one or more storage slots. In other embodiments, the at least one of the one or more foam cushions may be strategically positioned on the one or more sheet metal plates so as to not interfere with one or more calibration fiducials located on the one or more storage slots.

In some embodiments, the one or more sheet metal plates may have holes located in positions associated with the locations of each of the one or more tape cartridges. In some embodiments, the holes may provide an opening to identify which of the one or more storage slots contain a respective tape cartridge while the one or more tape cartridge restraint brackets are installed.

In some embodiments, the processor may incorporate a new function in a library firmware that is installed on the tape library. The new function may allow the tape library to identify the inventory and physical location of each of the one or more tape cartridges within the tape library.

In some embodiments, the new function may further allow tape library robotics to position and move the one or more tape cartridges within the tape library such that the one or more storage slots are filled with the one or more tape cartridges (e.g., all the storage slots are filled, all the storage slots that the one or more tape cartridges can fill, etc.).

It is noted that the embodiments discussed herein may be used to supply restraining plates that can be used to restrain tape cartridges that are pre-installed into an automated tape library during shipment of the hardware (e.g., the automated tape library and the tape cartridges). The embodied plates can safely and securely hold all tape cartridges in a tape library in place during shipment. The plates are then able to be quickly removed from the tape library upon delivery of the library to its final destination at a datacenter.

This disclosed method and system work by loading tape cartridges into a[n automated] tape library prior to the tape library shipment. After the tape cartridges are loaded into the slots in the tape library, the tape cartridge restraint brackets are put in place to secure the cartridges for shipment.

The tape cartridge restraint brackets may consist of sheet metal plates with foam to cushion against the tape cartridges. In some embodiments, there are two different tape cartridge restraint brackets, one for tape cartridges located in the storage slots on the front door of the tape library and one for tape cartridges located in the deep slots in the rear of the tape library.

Figure 1A:
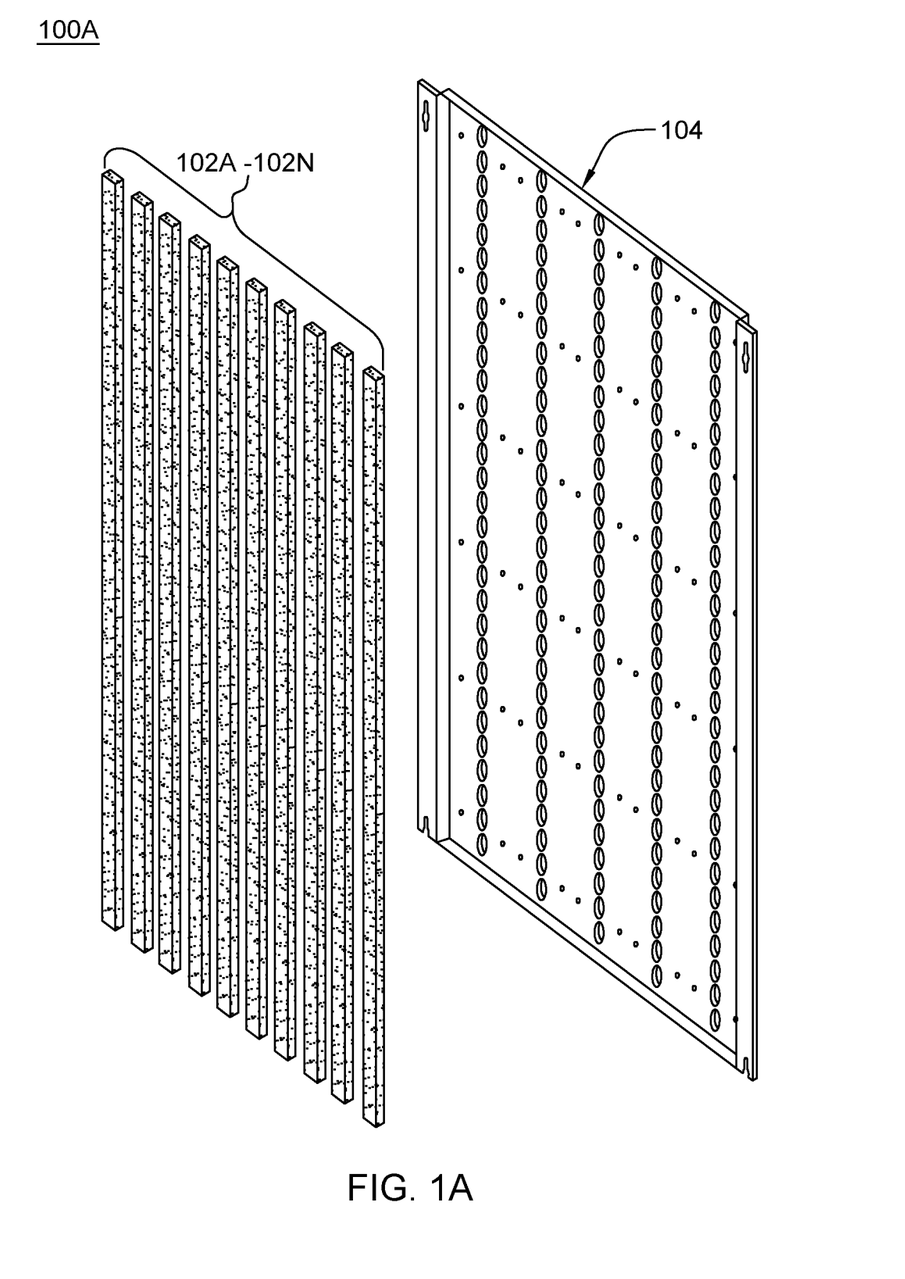
FIG. 1A illustrates an example of the component parts of a deep slot cartridge restraint bracket, in accordance with embodiments of the present disclosure.
Figure 1B:
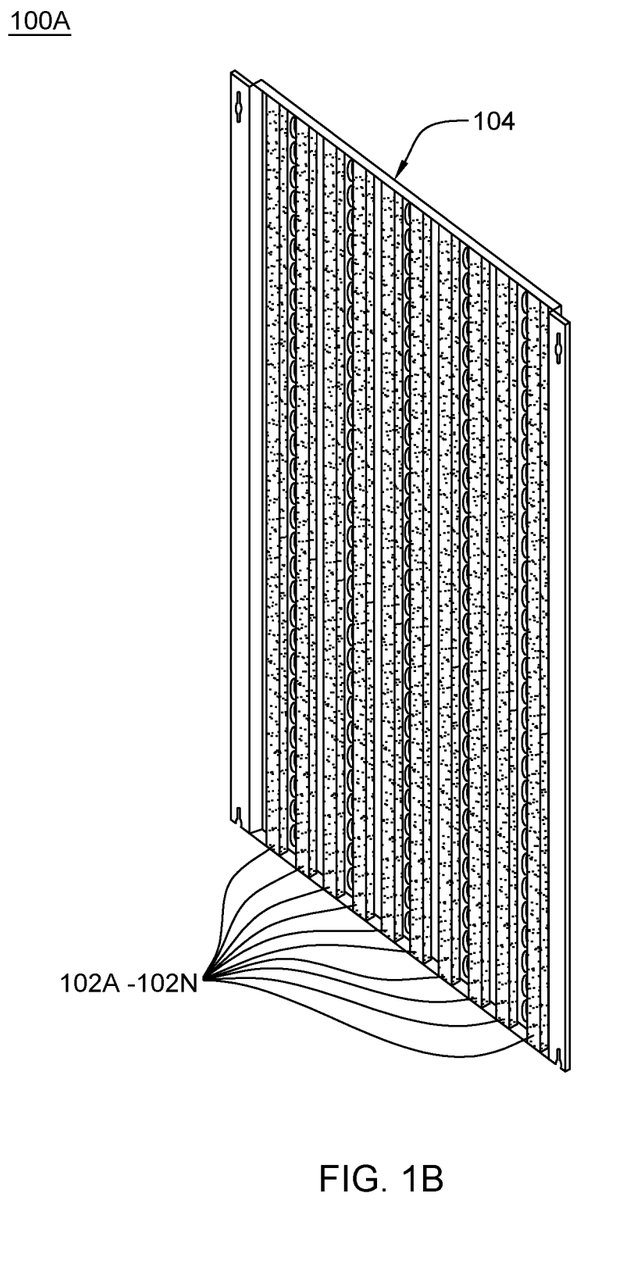
FIG. 1B illustrates an example of an assembled deep slot cartridge restraint bracket, in accordance with embodiments of the present disclosure.

Turning now to the FIGS., which are used to help describe the method and system currently disclosed within this disclosure. It is noted that like reference numerals are used to designate like parts in the accompanying drawings. FIG. 1A illustrates an example of the component parts of a deep slot cartridge restraint bracket 110A, in accordance with embodiments of the present disclosure. In some embodiments, the component parts of the deep slot cartridge restraint bracket 110A are foam strips 102A-N and a sheet metal support plate 104. FIG. 1B illustrates an example of the assembled version of the deep slot cartridge restraint bracket 110A, in accordance with embodiments of the present disclosure. It is noted that the assembled version of the deep slot cartridge restraint bracket 110A is comprised of the same foam strips 102A-N and the sheet metal support plate 104 as depicted in FIG. 1A.

Figure 1C:
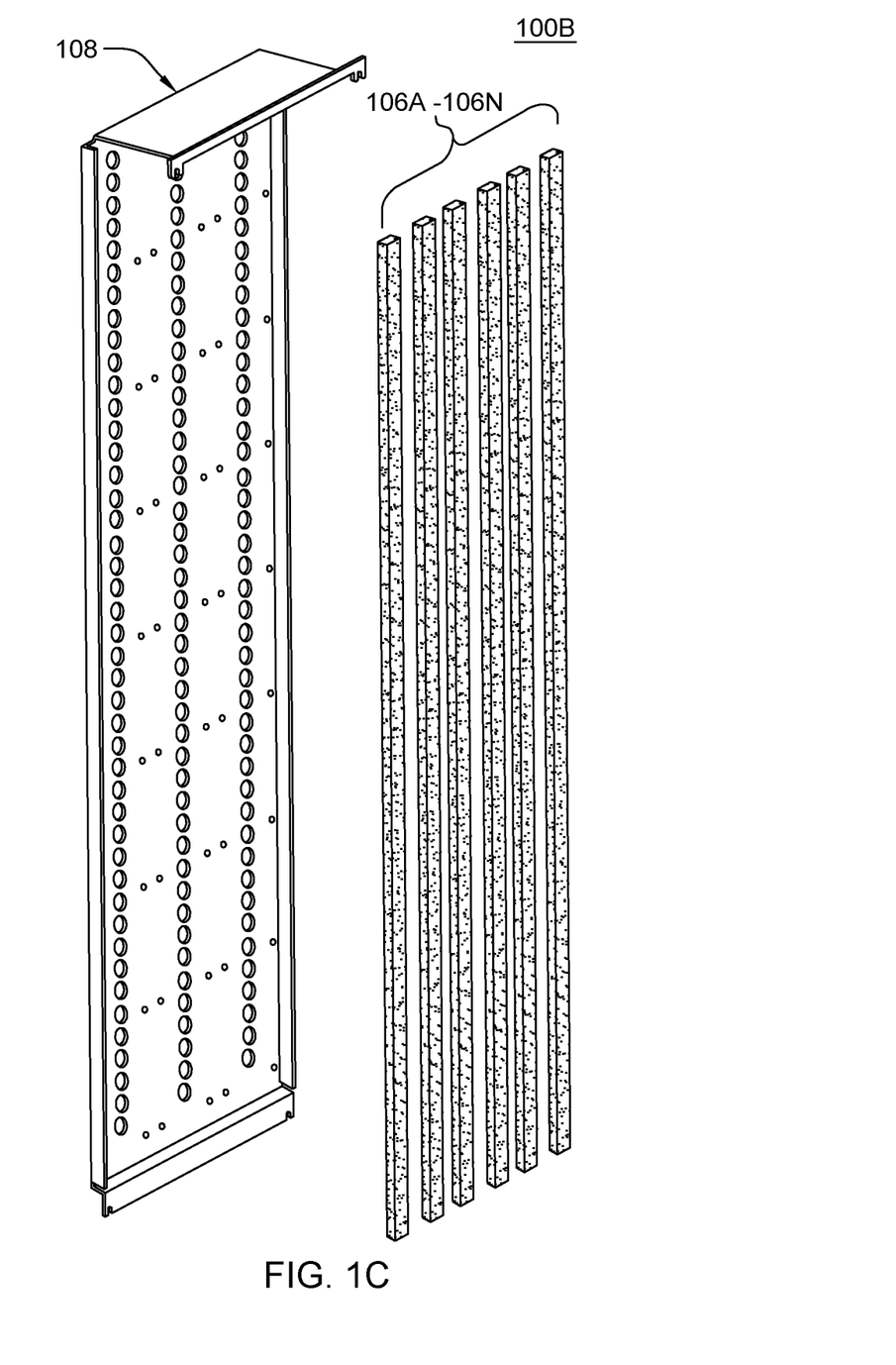
FIG. 1C illustrates an example of the component parts of a door side cartridge restraint bracket, in accordance with embodiments of the present disclosure.
Figure 1D:
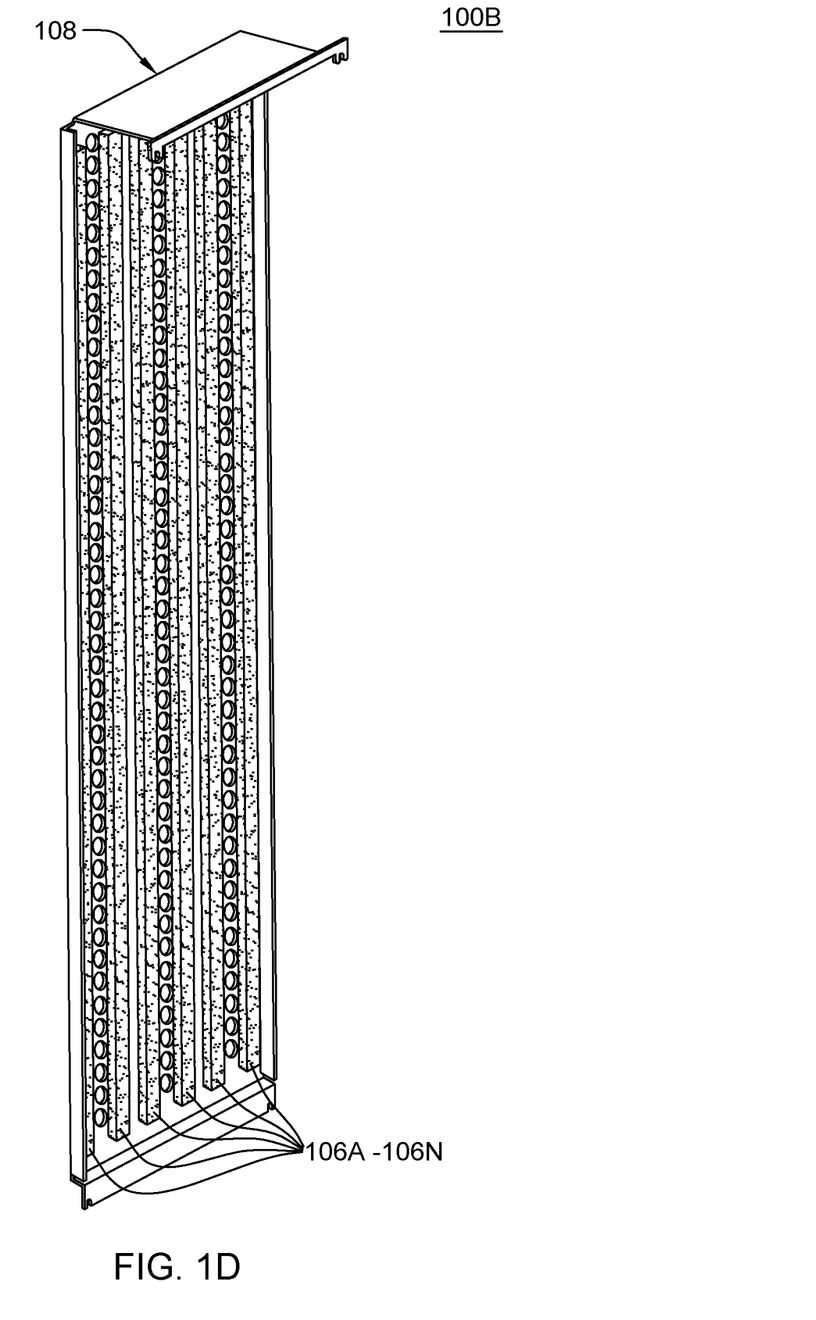
FIG. 1D illustrates an example of an assembled door side cartridge restraint bracket, in accordance with embodiments of the present disclosure.

FIG. 1C illustrates an example of the component parts of a door side cartridge restraint bracket 100B, in accordance with embodiments of the present disclosure. In some embodiments, the component parts of the door side cartridge restraint bracket 100B are foam strips 106A-N and a sheet metal support plate 108. It is noted that, in some embodiments the foam strips 106A-N the sheet metal support plate 108 may be the same or substantially the same as the foam strips 102A-N and the sheet metal support plate 104 of FIGS. 1A-B. FIG. 1D illustrates an example of the assembled version of the door side cartridge restraint bracket 100B, in accordance with embodiments of the present disclosure. It is noted that the assembled version of the door side cartridge restraint bracket 100B is comprised of the same foam strips 106A-N and the sheet metal support plate 108 as depicted in FIG. 1C.

As can be seen in FIGS. 1A-D. Each tape cartridge restraint bracket 100A and 100B consists of a sheet metal support plates 104 and/or 108 and foam strips 102A-N and/or 106A-N. The foam strips 102A-N and/or 106A-N are placed on the support plates 104 and/or 108 such that they contact a front portion of tape cartridges when they are installed in tape library slots (depicted more fully in regard to FIGS. 2A-D and FIG. 3). Each tape cartridge at the front of a slot will contact at least two of the foam strips 102A-N and/or 106A-N such that each tape cartridge is held on each side (e.g., front/back of the tape cartridge, a first side/opposite side of the tape cartridge, etc.) to prevent any twisting and/or swivel motion within a tape library storage slot during the vibrations that come from shipping an automated tape library.

It is noted that the foam strips 102A-N and/or 106A-N are strategically placed as to not interfere with latch mechanisms of the deep slots and/or calibration fiducials located on the deep cells. By avoiding latch mechanisms and/or calibration fiducials, critical features of a tape library are preserved and not damaged (e.g., scuffed, broken, render unusable) by the vibration induced during shipment of the tape library. In some embodiments, the support plates 104 and 108 have holes located in accordance with each cartridge location within tape library storage slots. The holes allow a user and/or a system to be able to identify if a storage slot contains a tape cartridge even with the tape cartridge restraint bracket 100A and/or 100B installed.

Figure 2A:
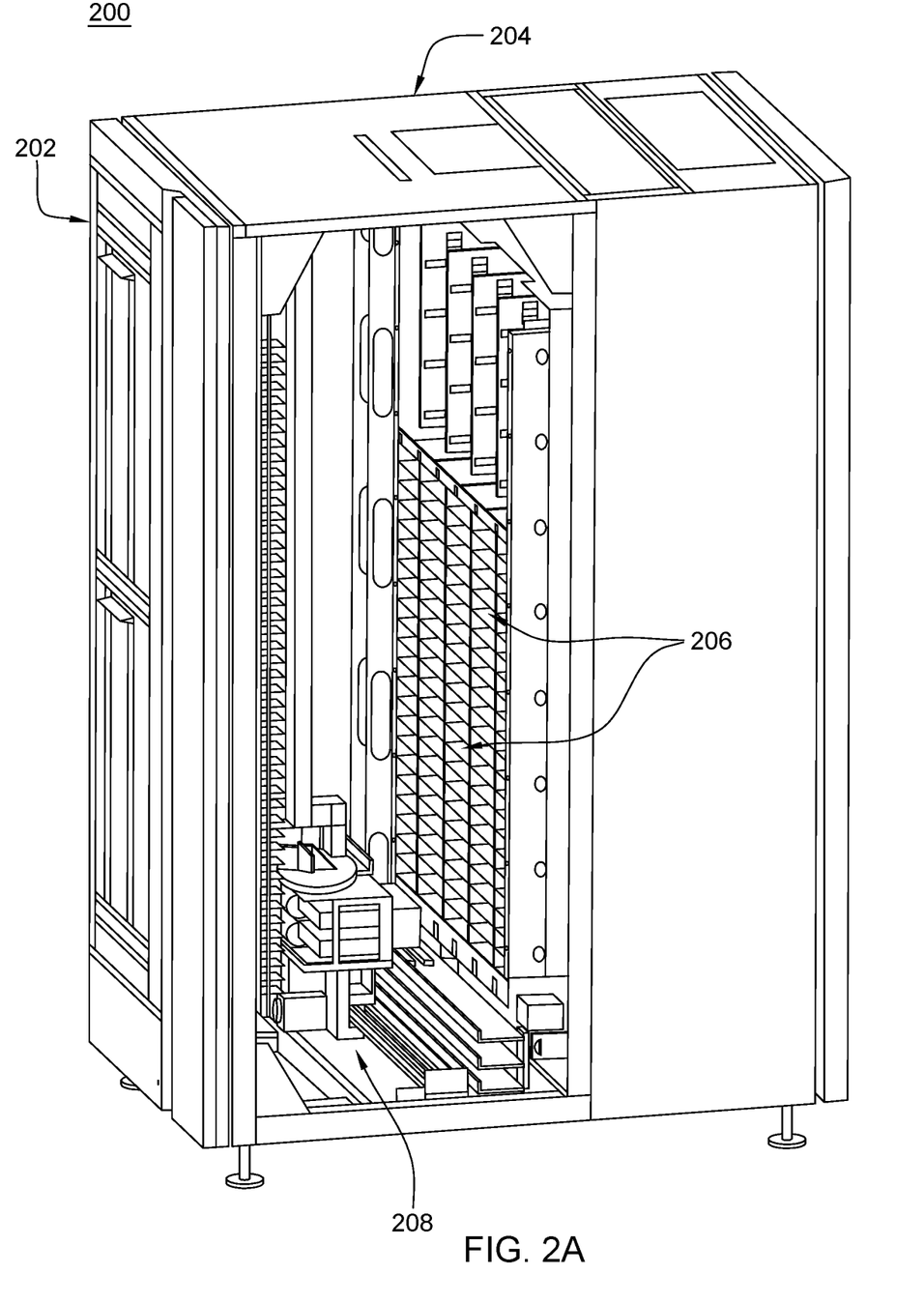
FIG. 2A illustrates a first isometric view of a tape library with no cartridge restraint brackets installed, in accordance with embodiments of the present disclosure.
Figure 2B:
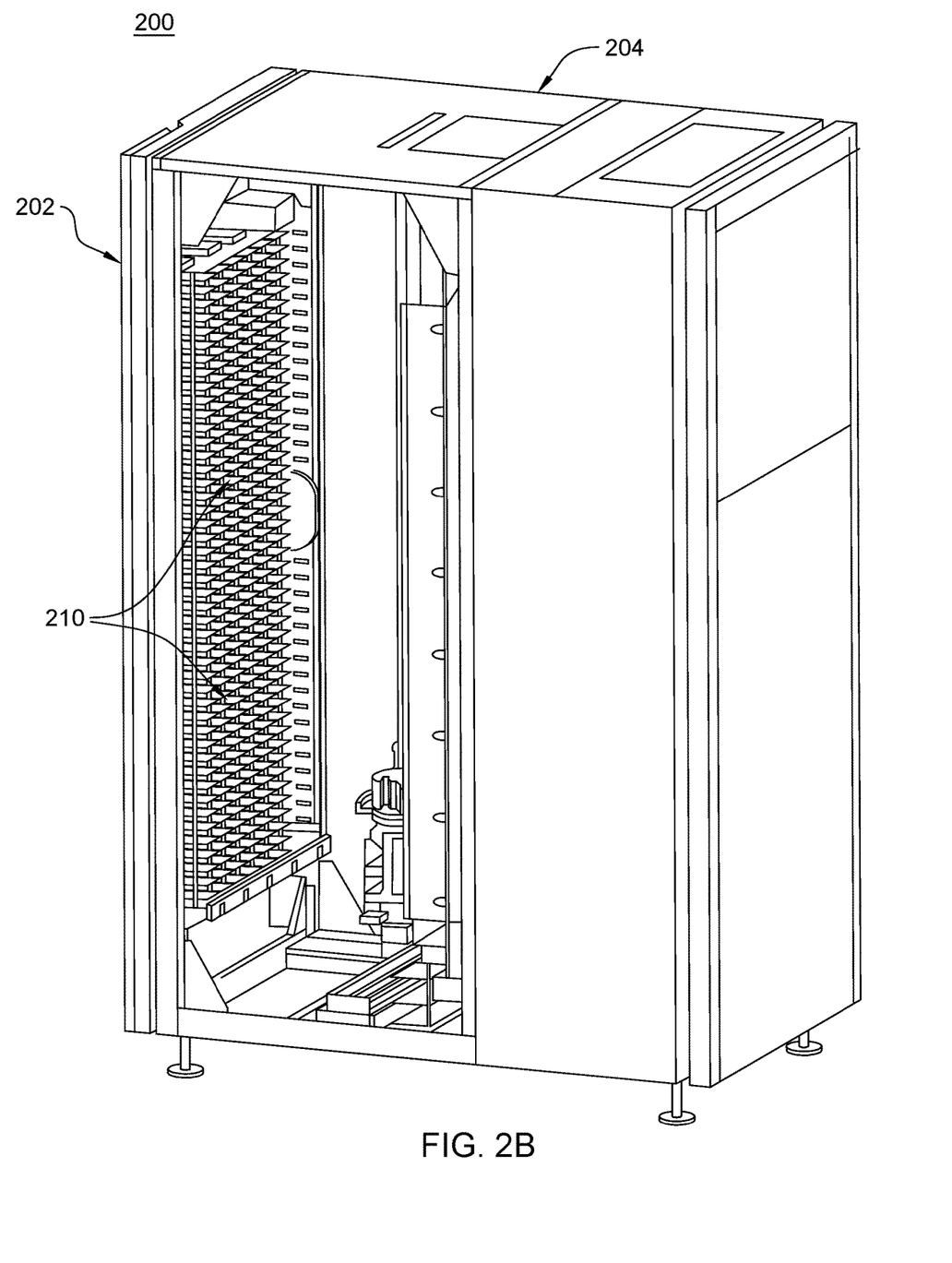
FIG. 2B illustrates a second isometric view of a tape library with no cartridge restraint brackets installed, in accordance with embodiments of the present disclosure.

Referring now to FIGS. 2A and 2B, which respectively illustrate a first and a second isometric view of a tape library 200 with no cartridge restraint brackets installed, in accordance with embodiments of the present disclosure. It is noted that FIGS. 2A and 2B are depicted with the tape library 200 having a side cover removed so that the internal features (e.g., deep slots 206 of the tape library 200, robotics assessor 208 of the tape library 200, and door side storage slots 210 of the tape library 200) of the tape library 200 can be seen housed within a tape library frame 204. It is further noted that there is are robotic accessor aisle cartridge storage slot (not labeled) located on both sides of the robotic accessor aisle, which is a path depicted by the white area shown in FIGS. 2A and 2B and which allows the robotic accessor 208 to freely move (e.g., laterally, horizontally, rotationally, etc.) within the tape library 200.

The storage slots located on a tape library front door 202 of the tape library 200 are denoted as door side slots 210, while the storage slots located on the opposite side of (both the tape library front door 202 and) the robotic accessor aisle are denoted as the deep slots 206 of the tape library 200. In such an embodiment that is depicted in FIGS. 2A and 2B, the door side storage slots 210 may only have the capacity to hold one tape cartridge, with no other tape cartridges stored behind the one tape cartridge. In some embodiments, the deep slots 206 can contain multiple tape cartridges that are pushed by a spring toward the front of the robotic accessor aisle (e.g., directionally toward the tape library front door 202) of the deep slots 206. It is noted that the number of rows of storage slots and slot spacing on the door side storage slots 210 and the deep slots 206 are not the same, so as to have a respective one tape cartridge in the door side storage slots 210 and the other tape cartridges stored within the deep slots 210, as previously discussed above.

Figure 2C:
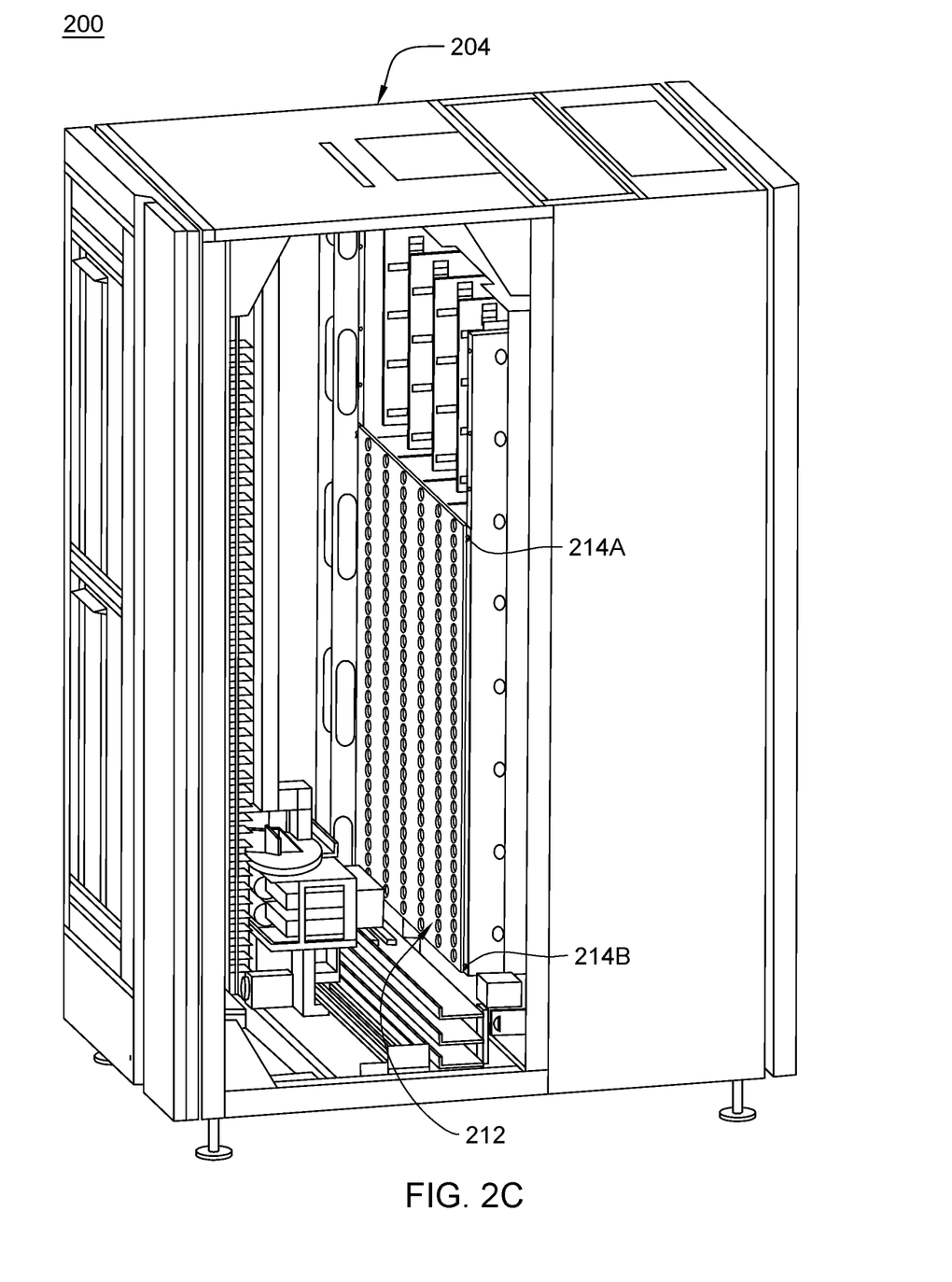
FIG. 2C illustrates a first isometric view of a tape library with cartridge restraint brackets installed, in accordance with embodiments of the present disclosure.
Figure 2D:
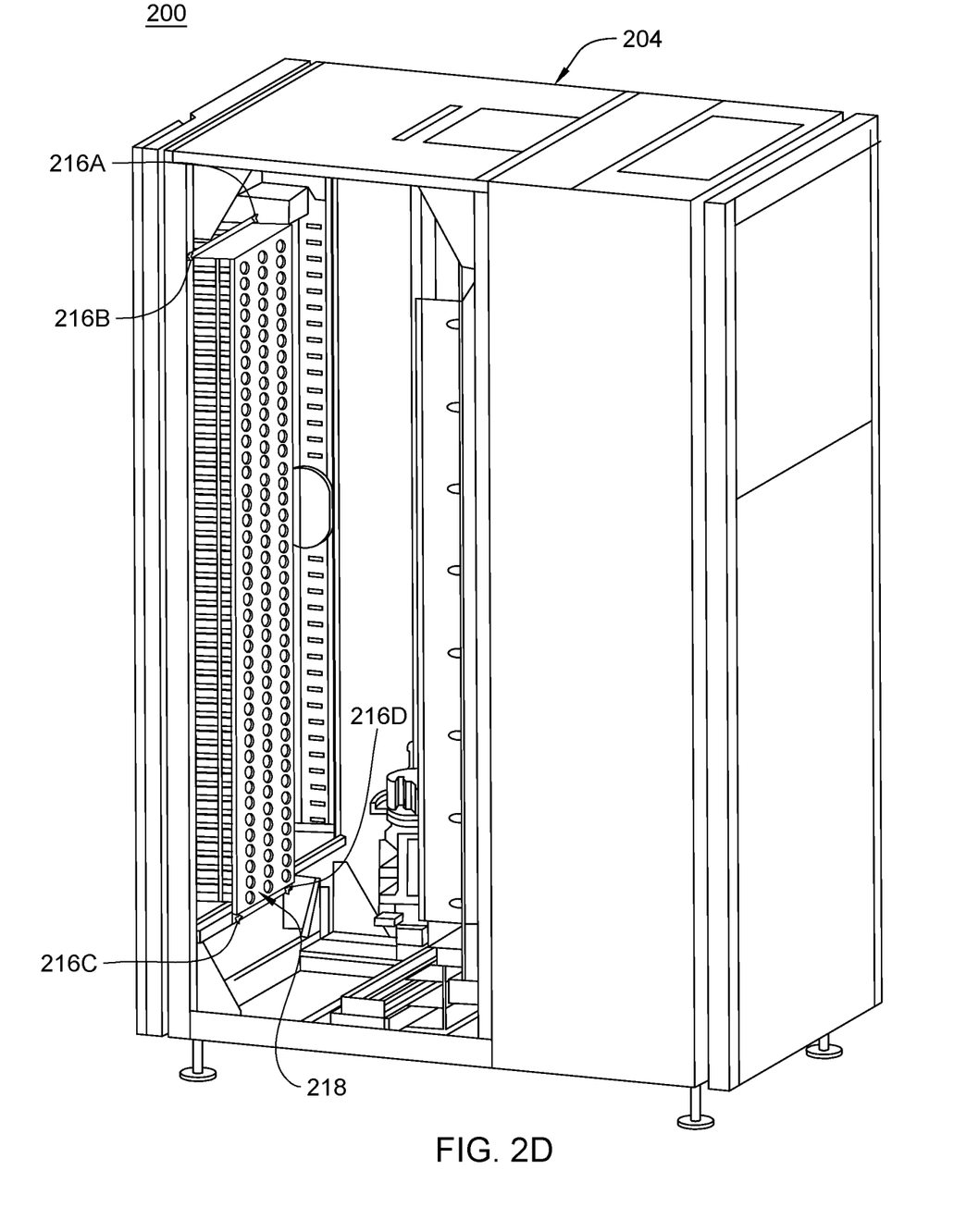
FIG. 2D illustrates a second isometric view of a tape library with cartridge restraint brackets installed, in accordance with embodiments of the present disclosure.

Referring now to FIGS. 2C and 2D, which respectively illustrate a first and a second isometric view of the tape library 200 with tape cartridge restraint brackets (e.g., deep slot cartridge restraint bracket 212 and door side cartridge restraint bracket 218) installed, in accordance with embodiments of the present disclosure. It is noted that the tape library 200 of FIGS. 2C and 2D are the same as, and or substantially the same as, the tape library 200 of FIGS. 2A and 2B, which includes the same, or substantially the same tape library frame 204 (and, in some embodiments, the same tape library front door 202). Further, the tape cartridge restraint brackets (e.g., deep slot cartridge restraint bracket 212 and door side cartridge restraint bracket 218) may be the same or substantially similar to the tape cartridge restraint brackets 100A and 100B as depicted in FIGS. 1A-D.

In some embodiments, deep slot cartridge restraint bracket 212 and door side cartridge restraint bracket 218 are respectively installed with wing screws at attachment locations 214A-B and/or attachment locations 216A-D so that no tools are required to remove the deep slot cartridge restraint bracket 212 and door side cartridge restraint bracket 218 when being installed in a datacenter.

It is noted that one of the key aspects of this disclosure is that foam (e.g., foam strips 102A-N and/or 106A-N) on the cartridge restraint brackets (e.g., deep slot cartridge restraint bracket 212 and door side cartridge restraint bracket 218) keep tape cartridges from moving and vibrating within the slots 206 and/or 210 during shipping. For tape cartridges stored in the deep slots 206, a spring mechanism is used to push the tape cartridges from a respective back portion of the deep slots 206 to a respective front portion of the deep slots 206.

It is not desirable during shipping for tape cartridges in the deep slots 206 to slide back and forth within the deep slots 206 as unwanted debris can be generated. Due to this likely generation of debris, each deep slot 206, in some embodiments, should be completely full of tape cartridges, such that no deep slots 206 are partially filled where a partial "stack" of tape cartridges could slide back and forth within a deep slot 206 during shipping (e.g., either one deep slot 206 is installed with a tape cartridge or has no tape cartridge installed when a restraint bracket 212 and/or 218 is installed before shipment of a tape library 200). When an entire deep slot 206 is full of tape cartridges, the foam (e.g., foam strips 102A-N and/or 106A-N) on the cartridge restraint brackets 212 and/or 218 can supply a compressive force on a front cartridge that pushes an entire stack of tape cartridges in the deep slot 206 to the back of the deep slot 206, such that the spring pushing mechanism bottoms out against the back of the deep slot 206.

Figure 3:
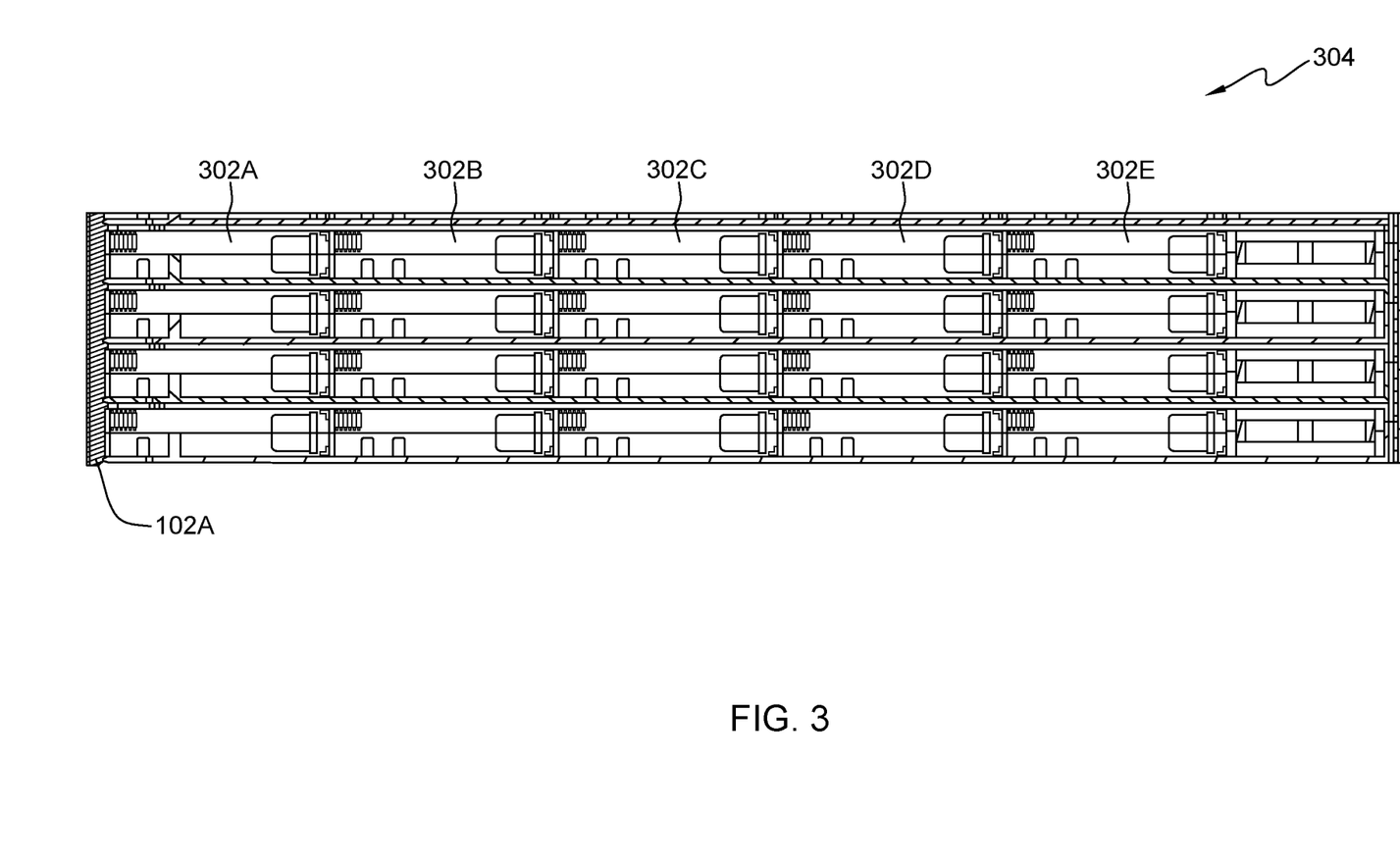
FIG. 3 illustrates a partial cutaway view showing tape cartridges installed in deep slots with cartridge restraint bracket, in accordance with embodiments of the present disclosure.

Referring now to FIG. 3, illustrated is a partial cutaway view 300 showing tape cartridges 302A-E installed in deep slots (e.g. 206 of FIG. 2A) with tape cartridge restraint brackets (100A, 100B of FIGS. 1A-D, and/or 212, 218 of FIGS. 2C-D), in accordance with embodiments of the present disclosure.

In some embodiments, a series of deep slots (e.g., depicted as 4 rows of deep slots) that are full of the tape cartridges 302A-E where a tape cartridge (e.g., spring) pushing mechanism 304 is pushed all the way to the back (e.g., "bottomed out") of a deep slot. It is noted that by bottoming out the tape cartridge pushing mechanism 304, the entire stack is held by the foam strip 102A and/or one of the foam strips 102A-N of the sheet metal support plate 104 (or, in some embodiments 106A-N of the sheet metal support plate 108) and the stack is not free to slide back, forth, and/or side-to-side within the deep slot during shipping of a tape library incorporating the tape cartridges 302A-E (e.g., such as the tape library 200).

In some embodiments, as previously discussed, to support shipment of full deep slots with tape cartridges 302A-E installed, a new function in the tape library can be run/installed in the tape library. In such an embodiment, the new function will be a prepare for shipment option in the tape library firmware. The firmware will allow the tape library to identify/know the inventory and/or physical location of each and every tape cartridge 302A-E (e.g., preinstalled, installed) within the tape library. In some embodiments, the prepare for shipment option will allow the tape library robotics (e.g., the robotic accessor 208) to move the tape cartridges 302A-E around the tape library such that all the deep slots that have tape cartridges are completely full.

That is, each deep slot within a row would then be either completely full or completely empty in order to protect a stack within the row. In some embodiments, if there are any deep slots that could only be partially filled, the library would determine to move additional cartridges from the deep slots to the door side slots (e.g., to empty a deep slot), or move additional cartridges from the door side slots to the deep slots (e.g., to completely fill a deep slot). This ensures that a "completely full" and/or a "completely empty" condition of the prepare for shipment option of the deep slots are met for shipping. In some embodiments, an additional enhancement to the prepare for shipment option/function would be to fill all of the deep slots starting at the bottom. In such an embodiment, the weight or center of gravity of the tape library is as low as possible, thus avoiding any concerns with a heavy, or high, center of gravity frame tipping over easily during shipment.

Figure 4A:
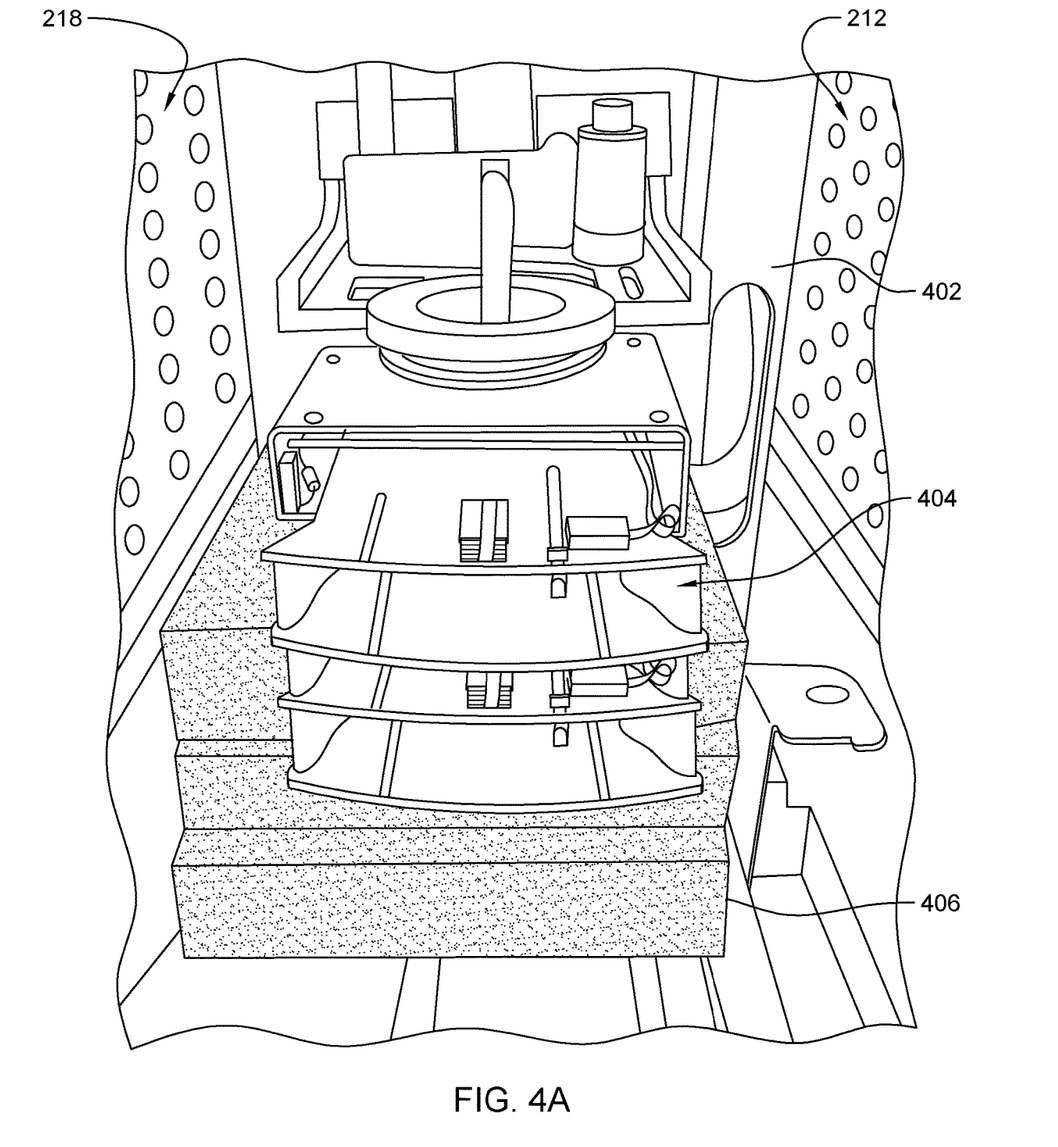
FIG. 4A illustrates an example of a protective structure holding a robotic picker mechanism at a 90-degree rotation, in accordance with embodiments of the present disclosure.

Referring now to FIG. 4A, illustrated is an example of a protective structure 400 for holding a robotic picker mechanism 404 at a 90-degree rotation, in accordance with embodiments of the present disclosure.

In some embodiments, when shipping a tape library frame that contains a robotic accessor 402 (or the robotic accessor 208), the robotic accessor 402 should not interfere with cartridge restraint brackets (e.g., the deep slot cartridge restraint bracket 212 and/or the door side cartridge restraint bracket 218). The robotic picker mechanism 404 of the robotic accessor 402 can rotate 180-degrees to pick cartridges from either door side slots or deep slots as previously described and seen in FIGS. 1A-D and 2A-D. When the cartridge restraint brackets 212 and 218 are installed additional packaging (e.g., robotic picker foam 406) is may be needed to secure the robotic accessor 402 for shipping by holding the robotic picker mechanism 404 at a 90-degree rotated position. In some embodiments, this allows for maximum spacing for the cartridge restraint brackets 212 and 218 and adequate thickness of the cartridge restraint bracket foam 102 A-N or 106 A-N to securely hold tape cartridges during shipment.

Figure 4B:
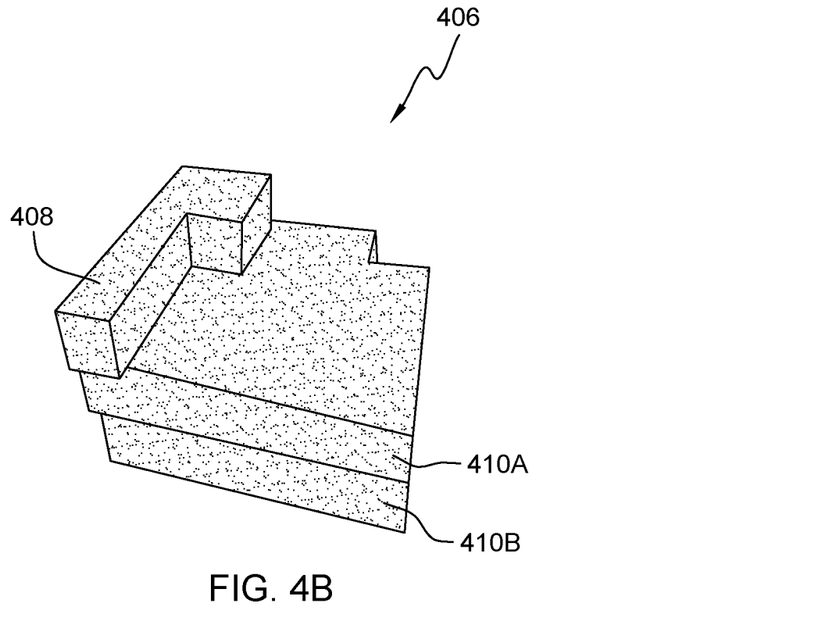
FIG. 4B illustrates an example of robotic picker foam formed for holding a robotic picker mechanism at a 90-degree rotation, in accordance with embodiments of the present disclosure.
Figure 4C:
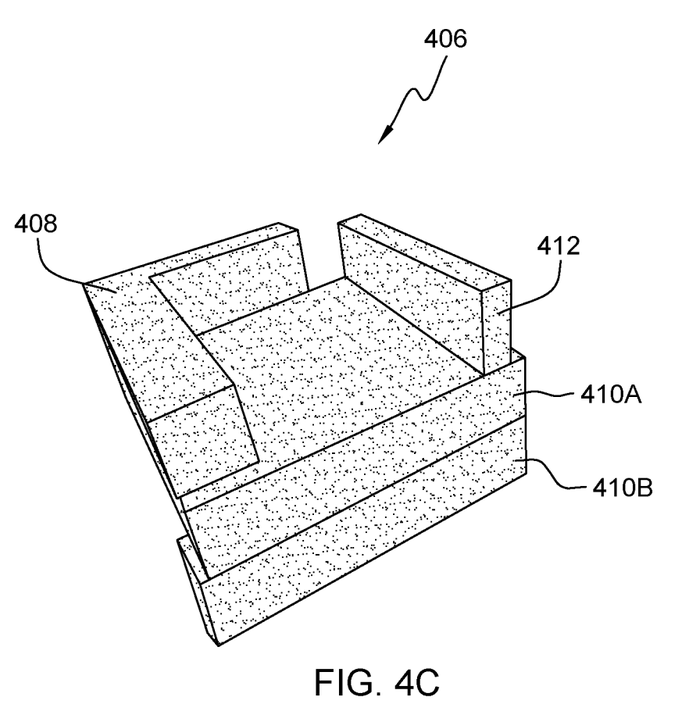
FIG. 4C illustrates another example of robotic picker foam formed for holding a robotic picker mechanism at a 90-degree rotation, in accordance with embodiments of the present disclosure.

Taking a closer look at the robotic picker foam 406, FIGS. 4B and 4C are discussed. FIGS. 4B and 4C illustrate an example of the robotic picker foam 406 formed for holding a robotic picker mechanism at a 90-degree rotation, in accordance with embodiments of the present disclosure. In some embodiments, the robotic picker foam 406 includes robotic picker foam bases 410A and 410B, respectively stacked upon one another. In some embodiments, the foam bases 410A and 410B may be a single piece of foam (e.g., there are no separate pieces of 410A and 410B, such that the foam base would just be a foam base 410). In some embodiments, the foam bases 410A and 410B (and all other foam pieces, e.g., robotic picker foam 408, etc.) are adhered to one another by heating one or more portions of the foam and placing the foam heated foam pieces on one another until cooled and attached thereto. For instance, a top portion of the foam base 410B and a bottom portion of the foam base 410A may be heated then pressed together until cooled and attached to one another, etc.

In some embodiments, an L-shape robotic picker foam 408 is placed on top of either robotic picker foam based 410A or 410B. In other embodiments, the robotic picker foam 406 further has a robotic picker foam wall 412 on top of either the robotic picker foam base 410A or 410B, and opposite one inside portion of the L-shape robotic picker foam. In some embodiments, the variant of the robotic picker foam 406 that is used to secure tape cartridges in a tape library for shipment may be based on the type of robotic picker mechanism 404 in a tape library and/or whether tape cartridges are being stored and ship within door side slots or deep slots of the tape library.

It is noted that FIGS. 4A-C are depicted as having various jutting pieces/portions of foam (e.g., 406, 408, and/or 410A/B). This is to indicate that the protective structures described herein may be tailored made for each tape library that is to be shipped (e.g., the jutting portions are to ensure a secure shipment of each tape cartridge installed within a tape library during shipment regardless of a version/type of tape library and/or tape cartridge being shipped). However, it is further noted that it is envisioned that each peach of foam depicted can be level and/or flush with each other piece it is adhered to and further, as stated above, the foam could be that of one (single) piece of foam that is structured to secure tape cartridges during shipment of a tape library.

Figure 5:
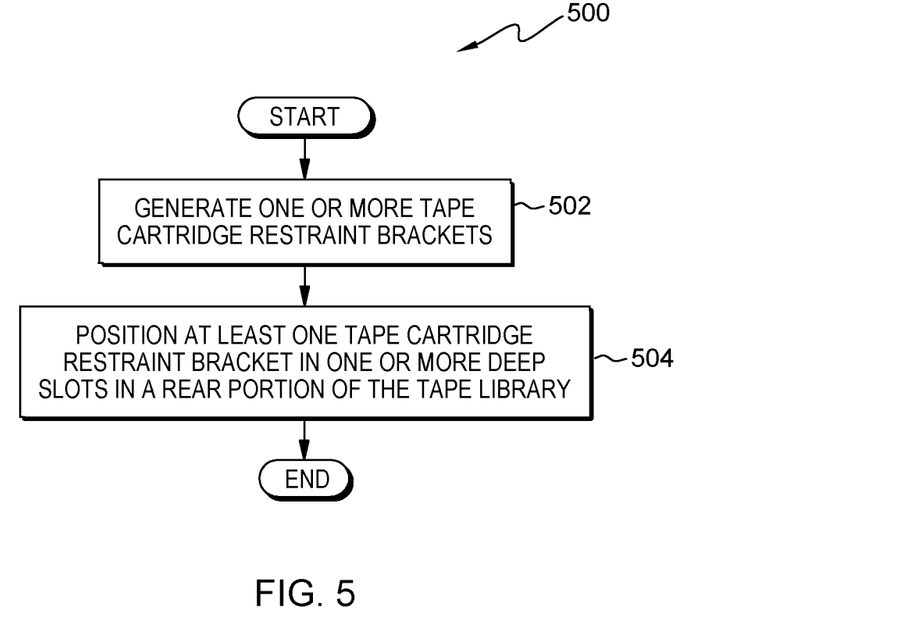
FIG. 5 illustrates a flowchart of an example method for shipping one or more tape cartridges installed in slots within an automated tape library, in accordance with embodiments of the present disclosure.

Referring now to FIG. 5, illustrated is a flowchart of an example method 500 for shipping one or more tape cartridges installed in slots within an automated tape library, in accordance with embodiments of the present disclosure. In some embodiments, the method 500 may be performed by a processor or a processor within a system.

In some embodiments, the method 500 begins at operation 502 where the processor generates one or more tape cartridge restraint brackets. In some embodiments, the method 500 proceeds to operation 504. At operation 504, the processor positions at least one tape cartridge restraint bracket in one or more deep slots in a rear portion of the tape library. In some embodiments, the method 500 ends after operation 506.

It is noted that the flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for shipping one or more tape cartridges installed in slots within an automated tape library, the method comprising:
generating one or more tape cartridge restraint brackets, wherein each tape cartridge restraint bracket is generated using one or more sheet metal plates that are respectively attached with one or more foam cushions, and wherein the one or more sheet metal plates have holes located in positions associated with physical locations of each of the one or more tape cartridges; and
positioning at least one of the tape cartridge restraint brackets in one or more deep slots in a rear portion of the tape library.

2. The method of claim 1, further comprising:
incorporating a function in a library firmware that is installed on the tape library, wherein the function allows the tape library to identify an inventory and the physical locations of each of the one or more tape cartridges within the tape library.

3. The method of claim 2, wherein the function further allows tape library robotics to position and move the one or more tape cartridges within the tape library such that the one or more storage slots are filled with the one or more tape cartridges.

4. The method of claim 1, wherein the one or more foam cushions are placed on the one or more sheet metal plates such that the one or more foam cushions contact a front portion of the one or more tape cartridges after the one or more tape cartridges are installed into storage slots of the tape library.

5. The method of claim 4, wherein each of the front portions of the one or more tape cartridges contact at least one of the one or more foam cushions such that the one or more tape cartridges are held on each side to prevent a twisting motion and a swivel motion within the one or more storage slots during transport.

6. The method of claim 1, wherein the holes provide an opening to identify which of the one or more storage slots contain a respective tape cartridge while the one or more tape cartridge restraint brackets are installed.

7. An automated tape library shipping system, the system comprising:
one or more tape cartridge restraint brackets, wherein each tape cartridge restraint bracket is generated using one or more sheet metal plates that are respectively attached with one or more foam cushions, and wherein the one or more sheet metal plates have holes located in positions associated with physical locations of each of the one or more tape cartridges; and
at least one of the tape cartridge restraint brackets positioned in one or more deep slots in a rear portion of the tape library.

8. The system of claim 7, further comprising:
a function incorporated in a library firmware that is installed on the tape library, wherein the function allows the tape library to identify an inventory and the physical locations of each of the one or more tape cartridges within the tape library.

9. The system of claim 8, further comprising:
one or more tape library robotics, wherein the function further allows the one or more tape library robotics to position and move the one or more tape cartridges within the tape library such that the one or more storage slots are filled with the one or more tape cartridges.

10. The system of claim 7, wherein the one or more foam cushions are placed on the one or more sheet metal plates such that the one or more foam cushions contact a front portion of the one or more tape cartridges after the one or more tape cartridges are installed into storage slots of the tape library.

11. The system of claim 10, wherein each of the front portions of the one or more tape cartridges contact a at least one of the one or more foam cushions such that the one or more tape cartridges are held on each side to prevent a twisting motion and a swivel motion within the one or more storage slots during transport.

12. The system of claim 7, wherein the holes provide an opening to identify which of the one or more storage slots contain a respective tape cartridge while the one or more tape cartridge restraint brackets are installed.

* * * * *